US 6,715,873 B2

(12) United States Patent
Nahmias

(10) Patent No.: US 6,715,873 B2
(45) Date of Patent: Apr. 6, 2004

(54) EYEWEAR ASSEMBLY WITH SIDE SHIELDS AND METHOD OF INSTALLING SAME

(75) Inventor: Robert J. Nahmias, Duxbury, MA (US)

(73) Assignee: The Hilsinger Company, L.P., Plainville, MA (US)

(*) Notice: Subject to any disclaimer, the term of this patent is extended or adjusted under 35 U.S.C. 154(b) by 0 days.

(21) Appl. No.: 10/271,413

(22) Filed: Oct. 15, 2002

(65) Prior Publication Data
US 2003/0071963 A1 Apr. 17, 2003

Related U.S. Application Data
(60) Provisional application No. 60/329,729, filed on Oct. 16, 2001.

(51) Int. Cl.$^7$ ................................................ G02C 7/10
(52) U.S. Cl. ............................. 351/44; 351/121; 2/13; 2/449
(58) Field of Search ..................... 351/41, 44, 111, 351/116, 121; 2/13, 448, 449, 450, 451

(56) References Cited

U.S. PATENT DOCUMENTS

| 2,224,784 A | 12/1940 | Goldschmid et al. ............ 2/13 |
| 2,281,129 A | 4/1942 | Wolff ............................ 2/13 |
| 2,840,821 A | 7/1958 | Gay, Jr. et al. .................. 2/13 |
| 3,165,754 A | 1/1965 | Rodgers et al. ................. 2/13 |
| 3,204,252 A | 9/1965 | Herrington, Sr. ................ 2/13 |
| 3,384,903 A | 5/1968 | Malcom, Jr. .................... 2/14 |
| 3,436,761 A | 4/1969 | Liautaud et al. ................ 2/13 |
| 3,505,679 A | 4/1970 | Bennett ........................... 2/13 |
| 3,596,290 A | 8/1971 | Kennedy ......................... 2/13 |
| 3,721,490 A | 3/1973 | Prince .......................... 351/47 |
| 3,932,031 A | 1/1976 | Johnston ...................... 351/47 |
| 4,298,991 A | 11/1981 | Recenello ....................... 2/13 |
| 4,526,448 A | 7/1985 | Hanson ....................... 351/153 |
| 4,751,746 A | 6/1988 | Rustin ........................... 2/13 |
| 4,965,887 A | 10/1990 | Paoluccio et al. ............... 2/9 |
| 5,224,248 A * | 7/1993 | Brilliant ........................ 29/20 |
| 5,422,684 A | 6/1995 | Keller ......................... 351/41 |
| 5,543,864 A | 8/1996 | Hirschman et al. ........... 351/47 |
| 5,548,351 A | 8/1996 | Hirschman et al. ........... 351/47 |
| 5,798,815 A | 8/1998 | Hirschman et al. ........... 351/44 |
| 5,940,161 A | 8/1999 | Hirschman et al. ........... 351/44 |
| 6,007,196 A | 12/1999 | Saba et al. .................... 351/44 |
| 6,270,216 B1 * | 8/2001 | DiChiara ....................... 351/44 |
| RE37,530 E | 1/2002 | Hirschman et al. ........... 351/44 |

* cited by examiner

Primary Examiner—Huy Mai
(74) Attorney, Agent, or Firm—Barlow, Josephs & Holmes, Ltd.

(57) ABSTRACT

The assembly for attaching a side shield to an eyewear temple includes a temple having a first side and a second side. A lock member is connected to the first side of the temple with a lock aperture therethrough. A side shield, having a laterally running channel, is provided with side walls and a pair of channel apertures on opposing sides of the channel and aligned with one another transversely across the channel. An eyewear temple resides in the channel of the side shield with the lock aperture residing between and aligned with the pair of channel apertures. A lock pin, having an upper end and a lower end, is routed through the pair of channel apertures and the lock aperture thereby securing the side shield to the temple.

12 Claims, 6 Drawing Sheets

EYEWEAR ASSEMBLY WITH SIDE SHIELDS AND METHOD OF INSTALLING SAME

CROSS-REFERENCE TO RELATED APPLICATIONS

This application claims the benefit of provisional patent application U.S. Ser. No. 60/329,729, filed Oct. 16, 2001.

BACKGROUND OF THE INVENTION

The present invention relates to eyewear and, more particularly, to eyewear that is worn by a user for safety purposes.

Various environments are very dangerous due to the exposure of flying debris and other materials. For example, a tooling shop is constantly exposed to flying metallic debris which presents a particularly dangerous condition for the eyes of the people present in the environment. Such flying metallic debris, caused from drilling and cutting of metal tooling, can easily fly into the eyes of a person in the environment causing serious injury.

To avoid contact with such debris, safety eyewear is typically employed. Such safety eyewear is available in many different forms. The safety eyewear used usually varies according to the level of protection needed. For example, face shields are often employed to completely protect the face of the user when there is a large volume of debris. Also, goggles may be used to protect the eyes only of the user when the volume and nature of the debris is significant.

In many instances, conventional eyeglass frames and impact-resistance lenses are more than adequate to protect the users eyes from light debris found in most work environments. However, such conventional eyeglass frames and lenses do not typically provide adequate protection on the sides of the frames in the regions of the temples. Thus, these safety glasses, using an eyeglass frame and lenses, are vulnerable to debris from the side.

To address the vulnerability of the aforesaid eyeglass frames and lenses to impact of debris from the side, shields are typically affixed to sides of the frames, such as to the temples of the eyewear, to provide additional protection from debris entering from the side of the eyewear. Such shields are typically referred to as "side shields" and can be affixed to the temples of the eyewear by various methods. Unlike goggles and full face shields, the eyeglass frame configuration of safety glasses can be made to appear similar to normal eyeglasses thus improving the aesthetic appearance of them which would make the user more likely to wear them thus improving overall safety. Most importantly, the side shields must be retained in place at all times to ensure that side protection is available at all times.

In view of the foregoing, the side shields must be easy to attach and secure in place. In the prior art, side shields have been riveted to the temples of the eyewear. As a result, the installation is permanent thus requiring use of the side shields at all times. Also, various clips and the like have been employed in prior art side shield configurations to retain them in place. For example, various prior art assemblies employ a wedge member to push against the temple into frictional communication with the channel of a side shield into which the temple resides. As a result, the side shield is less likely to detach from the temple during use. However, these side shield assemblies still easily become loose during normal use and then slide easily along the temple making them much less effective as a protective device for the user.

In view of the foregoing, there is a need for a side shield assembly that can be easily and quickly installed securely without the need for complicated clips and other structures. There is also a demand for a side shield assembly that does not detach or become loose from normal use. There is a further demand for a side shield assembly that cannot slide along the length of a temple of an eyewear frame. There is particularly a demand for a side shield eyewear assembly that is aesthetically pleasing in appearance. Still further, there is a demand for a side shield eyewear assembly that is low profile in configuration and has few parts than prior art assemblies.

SUMMARY OF THE INVENTION

The present invention preserves the advantages of prior art eyewear side shield assemblies and methods of installing the same. In addition, the improved eyewear side shield assembly of the present invention and method of installation provides new advantages not found in currently known assemblies and methods and overcomes many disadvantages of such currently available assemblies and methods.

The invention is generally directed to the novel and unique eyewear side shield assembly and method of attaching such a side shield assembly to an eyewear temple. The side shield assembly of the present invention includes a temple having a first side and a second side. A lock member is connected to the first side of the temple with a lock aperture therethrough. A side shield, having a laterally running channel, is provided with side walls and a pair of channel apertures on opposing sides of the channel and aligned with one another transversely across the channel. An eyewear temple resides in the channel of the side shield with the lock aperture residing between and aligned with the pair of channel apertures. A lock pin, having an upper end and a lower end, is routed through the pair of channel apertures and the lock aperture thereby securing the side shield to the temple. With the lock pin of the present invention in place, the side shield cannot detach from or slide along the temple of the eyewear.

To install the eyewear side shield assembly of the present invention, the temple of an eyewear frame is placed into the channel of the side shield so that the apertures on opposite sides of the channel are positioned on opposite sides of the aperture through the lock member, such as a wire loop, residing on the inner side of the temple of the eyewear frame. The lock pin is routed through a first aperture through the side shield, then through the aperture through the lock member and then through the aperture in the side shield located on the opposite side of the channel. Excess length of the lock pin extending below the side shield is preferably trimmed to make the assembly more attractive in appearance.

Accordingly, it is a primary object of the instant invention to provide an improved side shield assembly for eyewear.

Another object of the instant invention is to provide an improved eyewear side shield assembly that can be quickly and easily installed without the need for special tools.

Still further, an object of the instant invention is to provide an improved eyewear side shield assembly that does not become loose over time.

It is yet another object of the present invention to provide a turn button that obviates the need for a separate fastener, such as a rivet or screw.

A further object of the present invention is to provide an improved eyewear side shield assembly that does not slide along the length of an eyewear temple on which it is attached.

Another object of the present invention is to provide an improved eyewear side shield assembly that can be easily detached from the temple of an eyewear temple.

A further object of the present invention is to provide an improved eyewear side shield assembly that is aesthetically pleasing in appearance.

Another object of the present invention is to provide an improved eyewear side shield assembly that has few parts to reduce the complexity and cost of the assembly.

Yet a further object of the present invention is to provide a method of installing an improved eyewear side shield assembly to an eyewear temple.

A further object of the present invention is to allow the safety eyewear product to be supplied with temples that have the same thickness as non-safety eyewear.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
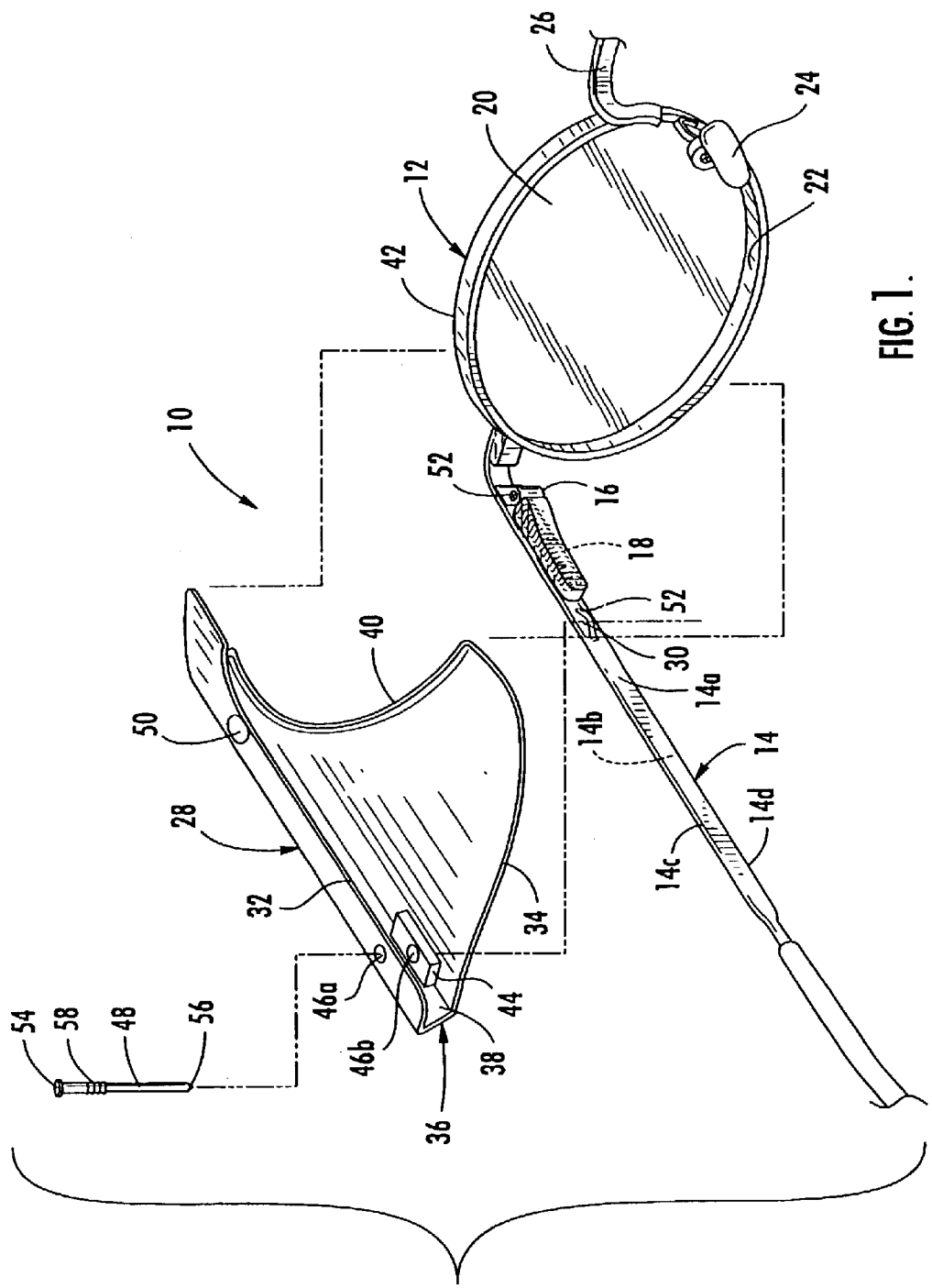
FIG. 1 is an exploded perspective view of the eyewear side shield assembly of the preferred embodiment of the present invention.

Referring first to FIG. 1, an exploded perspective view of the eyewear side shield assembly 10 of the preferred embodiment of the present invention is shown. For example, the assembly 10 of the present invention is preferably incorporated into a standard eyewear configuration, as shown in the figures. This assembly includes an eyewear frame, generally referred to as 12, that includes a temple 14 that is hingedly connected thereto by a hinge 16. An optional spring 18, within housing 19, is connected across the hinge 16 in the usual fashion to maintain the positioning of the temple 14 relative to the rest of the frame 12. Alternatively, a conventional hinge 16 without a spring 18 may be utilized. A lens 20 is held in place by a lens encircling portion 22 of the frame 12. Other eyewear components, such as a nose pad 24 and bridge member 26 are also included in the eyewear assembly.

For ease of illustration purposes only, only one temple 14 and one lens 20 is shown but it should be understood that another side of the eyewear assembly 10 is employed but not shown which is a mirror image thereof. In a given eyewear configuration that employs the assembly 10 of the present invention, a pair of side shields 28, corresponding to each of the two temples 14 in an eyewear frame configuration is employed. For simplicity, attachment of one side shield 28 to one temple 14 will be discussed and shown in detail.

Further, the shown eyewear configuration is a standard frame 12 and lens configuration with a temple 14 hingedly connected thereto by hinge 16. Other eyewear configurations may employ the assembly of the present invention, such as a unitary molded frame design that does not include a hinged temple 14 or separate lens 22.

Still referring to FIG. 1, the eyewear assembly 12 is capable of receiving a side shield 28 in communication therewith. The side shield 28, in accordance with the present invention and as described below, is attached to the temple 14 of the frame 12 by an unique attachment construction. More specifically, a lock member 30 is preferably connected to an inner surface 14a of the temple, namely the surface that faces inwardly toward the side of the head of the wearer of the eyewear assembly 10. The lock member 30 is preferably in the form of a wire loop that is attached directly to the inner surface 14a of the temple 14. For example, if the eyewear frame 12, including the temple 14, is made of metal, the wire loop lock member 30 is soldered to the inner surface 14a of the temple 14. Alternatively, if the eyewear frame 12, including the temple 14, is made of plastic, the wire loop lock member 30 is integrally molded or formed with the rest of the eyewear frame 12. The lock member 30 provides an anchor onto which the side shield 28 is attached, as described in detail below.

Figure 4:
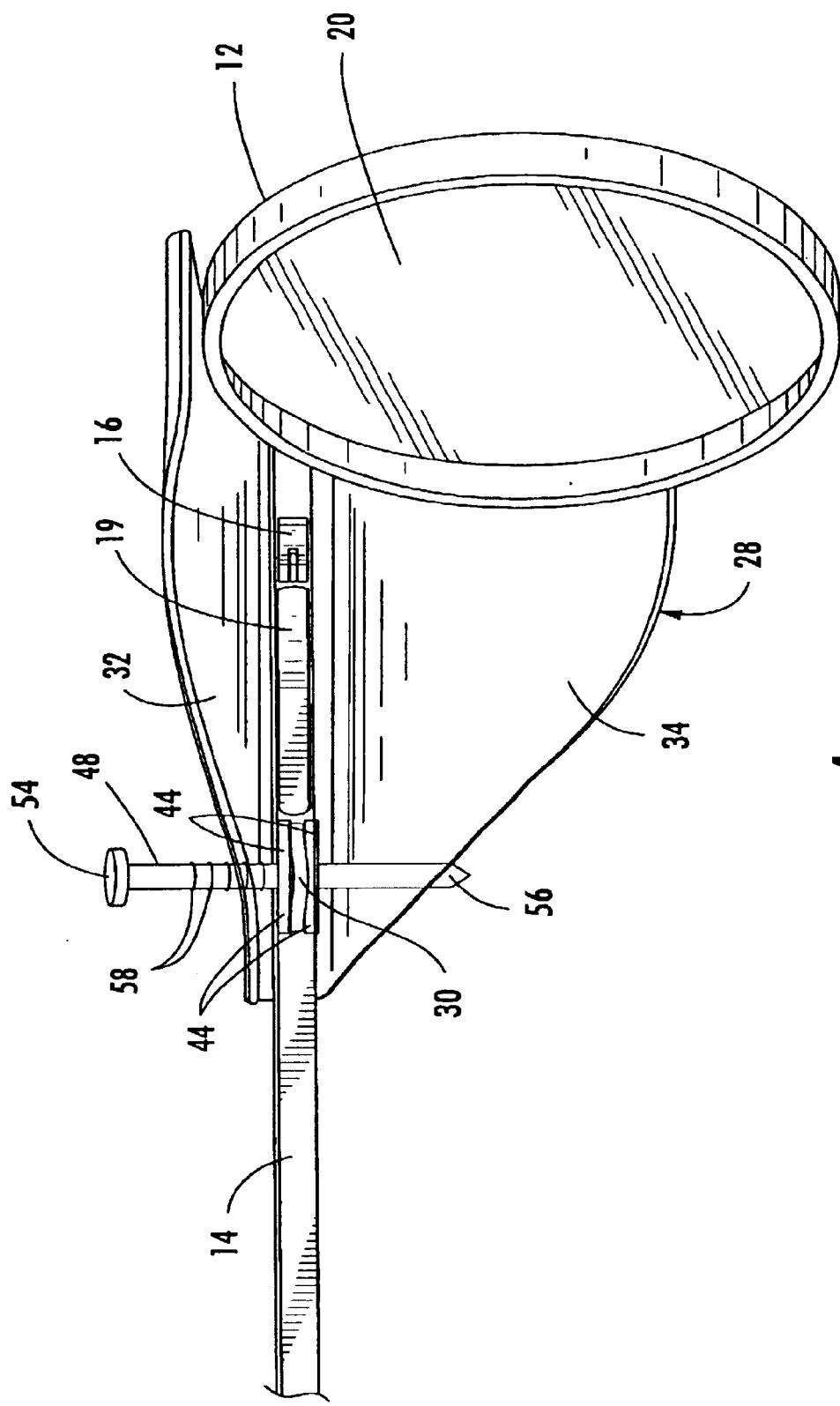
FIG. 4 is a side elevational view of the eyewear side shield assembly of the present invention with the lock pin in the process of being installed.
Figure 5:
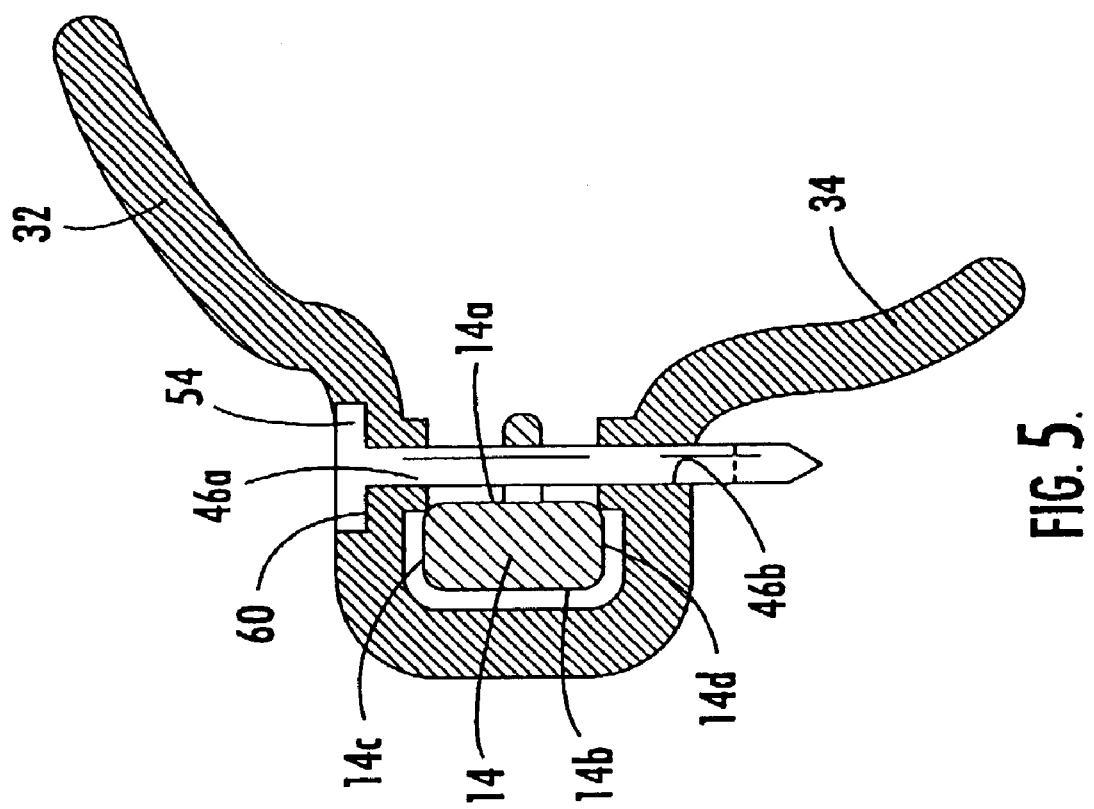
FIG. 5 is a cross-sectional view through the line 5—5 of FIG. 2.
Figure 6:
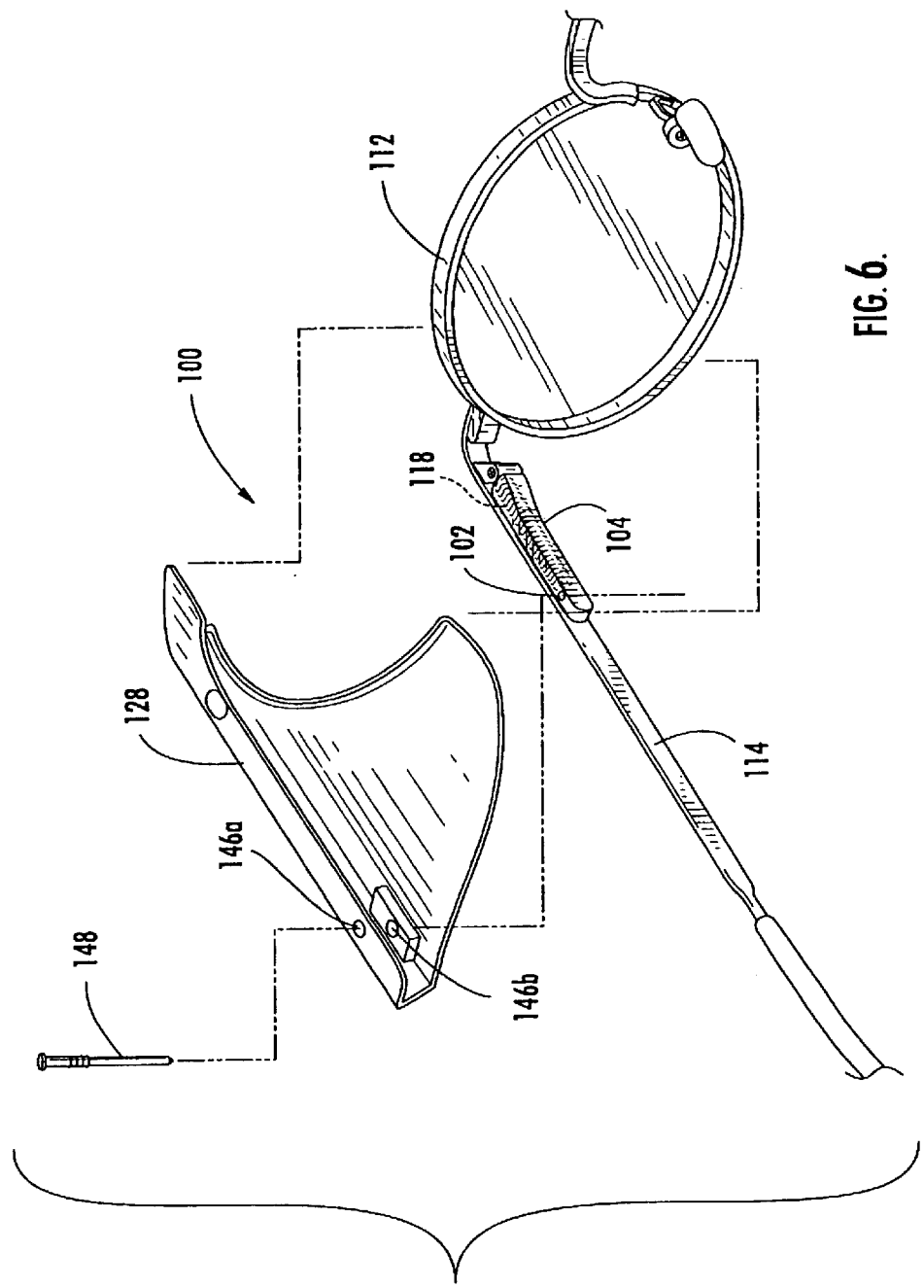
FIG. 6 is a perspective view of an alternative embodiment of the eyewear side shield assembly of the present invention.

The lock member 30 is shown in FIGS. 1–5 as a wire loop, by way of example. The lock member 30 may be in any form that can receive the lock pin 48, as described above. For example, a hole drilled in the temple 14 itself or spring hinge housing 104, as shown in FIG. 6, may be alternatively used.

Figure 2:
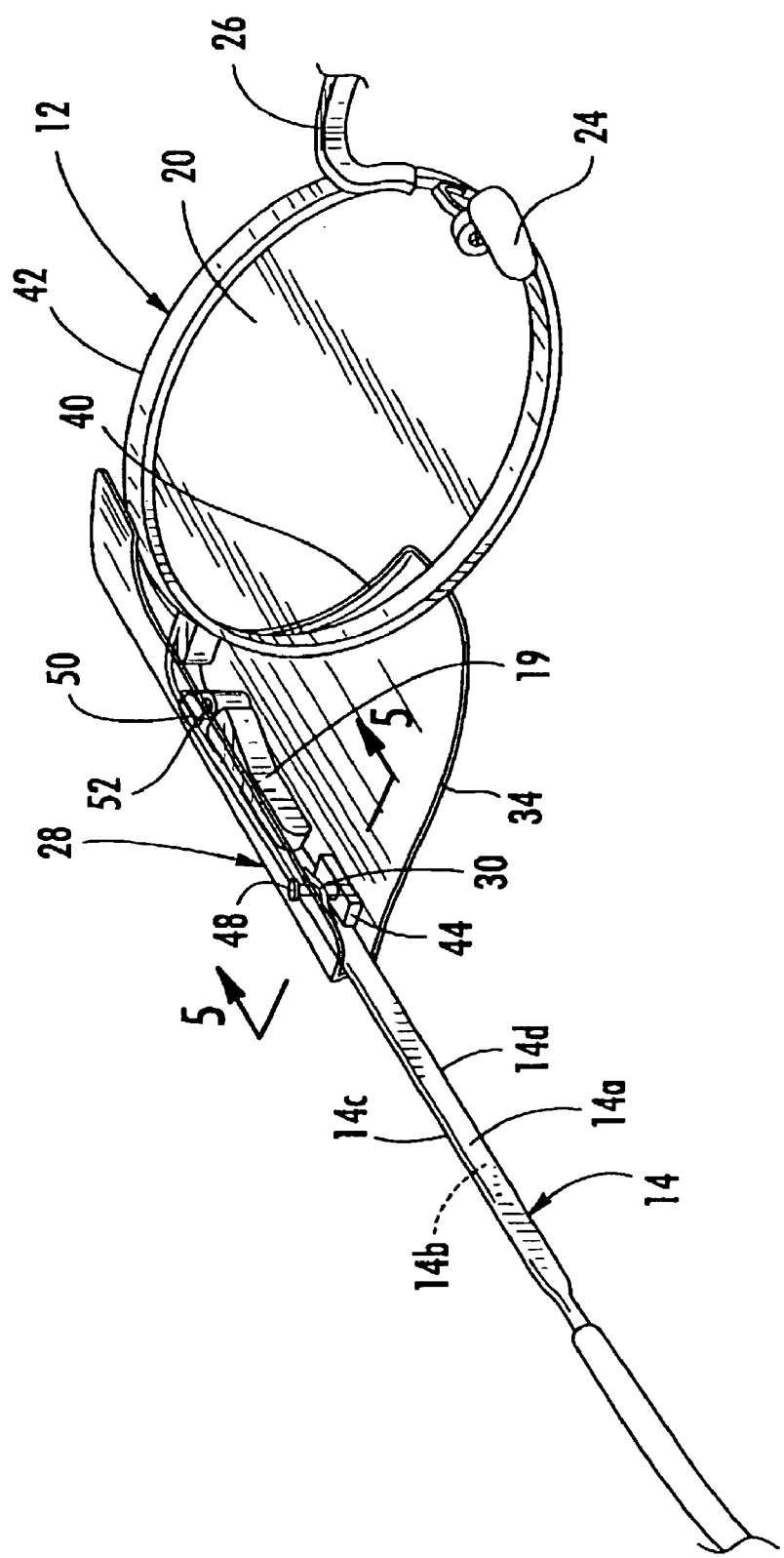
FIG. 2 is a perspective view of the eyewear side shield assembly of the present invention.

The side shield 28 includes an upper portion 32 and lower portion 34 with a transversely running channel 36 midway therebetween for slidably receiving an eyewear temple 14 therein. As shown in FIG. 2, the temple 14 is insertable into the channel 36 so that an outer surface 14b of the temple 14 faces toward the floor 38 of the channel 36. The outer surface 14b of the temple 14 need not touch the floor 38 of the channel 36 of the side shield 28. A front flange 40 is further provided on the side shield 28 for communicating with the front edge 42 of the eyewear frame 12, namely in the region of the eyeglass lens 20. This additional flange 40 provides additional stability to the side shield 28 when connected to the eyewear frame 12. As can be seen in FIGS. 2, 4 and 5, a pair of tabs 44 may be optionally employed to provide additional stability of the temple 14 within the channel 36 of the side shield 28. On opposing sides of the channel 36 are a pair of channel apertures 46a, 46b for receiving a lock pin 48 therethrough. An access hole 50 is also provided through the side shield 28 to permit easy access to the screw 52 located at the hinge 16 that connects the temple 14 to the eyewear frame 12.

Figure 3:
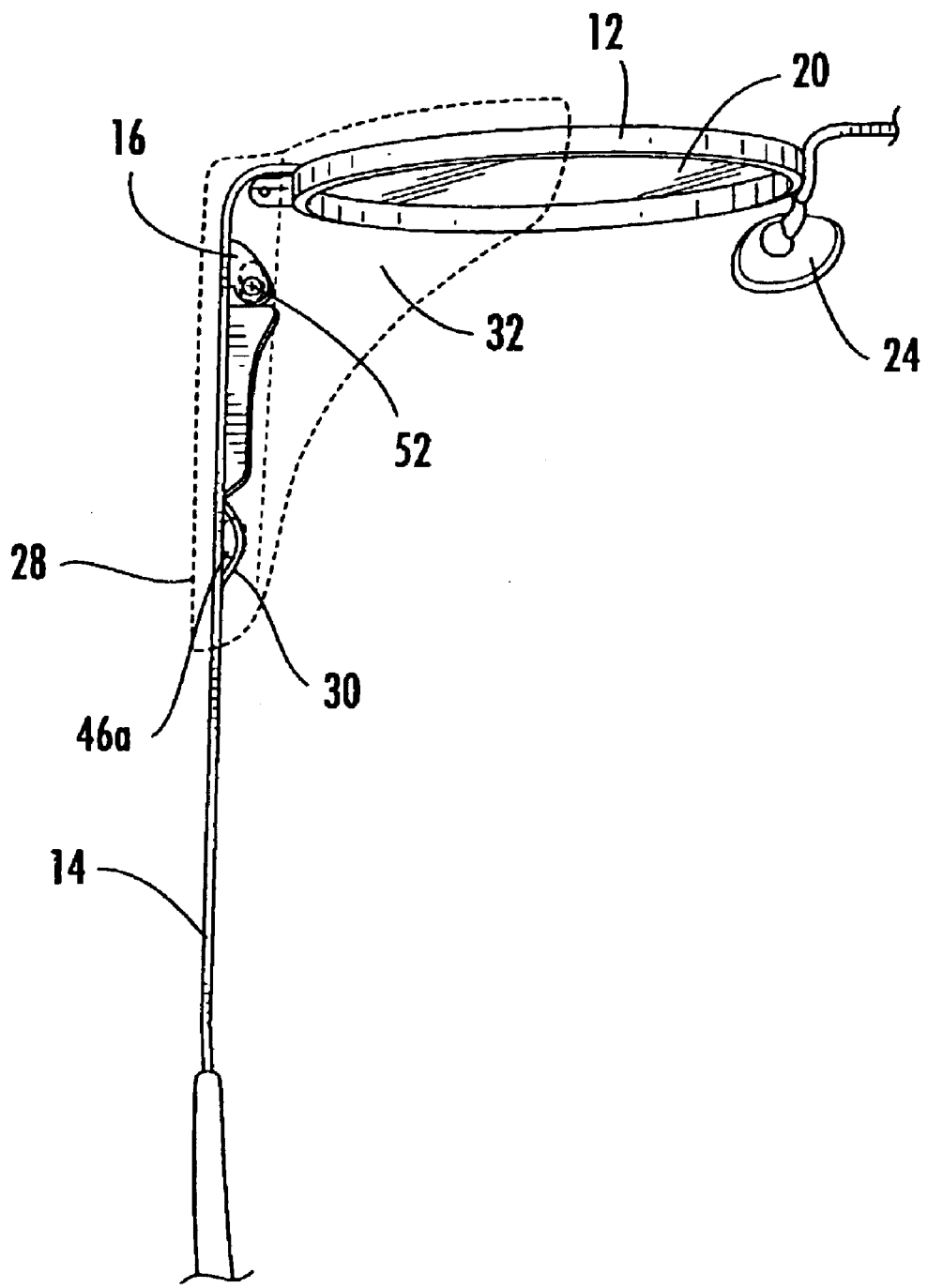
FIG. 3 is a top view of the eyewear side shield assembly of the present invention with the side shield shown in broken lines.

To install the assembly 10 of the present invention, the temple 14 is first inserted into the channel 36 of the side shield 28 with the front flange 40 of the side shield 28 in communication with the front of the eyewear frame 12. The side shield 28 is positioned as shown in FIGS. 2 and 3. As can be seen in FIGS. 2, 4 and 5, tabs 44 may be optionally employed to provide additional stability of the temple 14 within the channel 36. To insert the temple 14 into the channel 36 of the side shield 28 when tabs 44 are employed, the temple 14 is laterally aligned with the channel 36 and tilted at an angle relative thereto so that a leading edge of the temple 14 may first enter between the tabs 44. When the entire temple 14 has gone past the tabs 44, it is rotated to reside fully within the channel 36.

With the temple 14 residing in the channel 36 of the side shield 28, the side shield 28 is positioned so that the access hole 50 is over the screw 52 of the hinge 16 and the channel apertures 46a, 46b are aligned with the lock member 30, namely, the aperture 52 defined by the wire loop 30. FIG. 3 shows a top view of the installation of the side shield 28 illustrating this alignment.

Now that the side shield 28 is aligned on the temple 14, the lock pin 48 is preferably first inserted through the top channel aperture 46a, through the wire loop 30 and then through the bottom channel aperture 46b. FIG. 4 shows the lock pin 48 in the process of being inserted through the side shield 28 and wire loop 30. The lock pin 48 preferably includes a head 54 and tapered free end 56 to facilitate the routing through the side shield 28 and wire loop 30. Moreover, the lock pin 48 is also preferably made of a resilient material, such as nylon, so that it grippingly engages apertures 46a and 46b of side shield 28. Further, the lock pin 48 preferably includes circumferential ribs 58 to improve gripping to the side shield 28 to prevent the lock pin 48 from backing out therefrom.

FIG. 5 illustrates a cross-sectional view through the line 5—5 of FIG. 2 which illustrates the routing of the lock pin 48 through the channel apertures 46a, 46b and wire loop 30. The excess lower portion of the lock pin 48 at free end 56 may be trimmed at the broken line to make the installation more aesthetically pleasing. However, such trimming is not required.

It can be understood that the lock pin 48 may be alternatively inserted upwardly into the bottom channel aperture 46b first from below as opposed to being inserted first downwardly into the upper channel aperture 46a. With certain eyewear frame configurations, this routing direction may be preferred. Further, the lock member wire loop 30 is shown on the inner surface 14a of the temple 14 that faces the head of the wearer. Alternatively, the wire loop 30 can be attached to the outer surface 14b of the temple 14 that faces away from the wearer's head to engage with and align with various channel apertures 46a, 46b in the side shield 28. In this alternative configuration (not shown), the side shield 28 is be modified to accommodate the positioning of the lock member wire loop 30 on the outer surface 14b of the temple 14. In fact, the wire loop 30 member may be located on the top edge 14c bottom edge 14d of the temple 14 and the side shield 28 can be configured accordingly with, for example, a transversely extending lock pin 48.

Turning now to FIG. 6, an alternative embodiment 100 of the assembly of the present invention is shown. In this embodiment, the lock member is not a wire loop 30 as in the preferred embodiment 10 of FIGS. 1–5 but an aperture 102 through the housing 104 positioned about the temple hinge spring 118 on temple 114 attached to frame 112. In this embodiment, the aperture 102 aligns with the channel apertures 146a, 146b of the side shield 128 for receipt of the lock pin 148 therethrough. The functionality of the alternative embodiment 100 is, essentially, identical to that of the preferred embodiment 10 but may be considered more aesthetically pleasing in that the lock member 102 is integrated into the body of the housing 104 for the temple hinge spring 118.

FIG. 2 illustrates the assembly 10 of the preferred embodiment of the present invention fully installed onto an eyewear frame 12 employing the lock member wire loop 30 configuration. With this installation, the side shield 28 is secured to the eyewear frame 12 without the need for special tools or complex parts. Since the lock member 30 is a closed structure, namely a wire loop 30, the lock pin 48 and its engagement with the side shield 28 prevents the side shield 28 from not only becoming detached from the temple 14 but also prevents the side shield 28 from sliding along the length of the temple 14.

Therefore, no friction wedges, screws or rivets are required to secure the side shield 28, 128 to the temple 14, 114 and no additional tabs or other structures are required to prevent the side shield 28, 128 from sliding along the length of the temple 14, 114 of the eyewear frame 12, 112. The lock pin 48, 148 need only communicate with the side shield 28, 128. In fact, the lock members 30, 102 simply serve as pass through holes for the lock pin 48, 148 which need not touch the lock members 30, 102 in any way. This is because there is specifically no force fit of the temple 14, 114 into the channel of the side shield 28, 128. Thus, the side shield 28, 128 may be loosely secured to the temple 14, 114 in accordance with the assembly of the present invention yet still avoid detachment and sliding along the length of the temple 14, 114.

It would be appreciated by those skilled in the art that various changes and modifications can be made to the illustrated embodiments without departing from the spirit of the present invention. All such modifications and changes are intended to be covered by the appended claims.

What is claimed is:

1. An eyewear assembly, comprising:
   a temple having a first side and a second side;
   a lock member connected to the first side of the temple; the lock member defining a pass-through lock aperture therethrough;
   a side shield having a laterally running channel having side walls and defining a pair of channel apertures, with respective side walls, on opposing sides of the channel and aligned with one another transversely across the channel; the temple residing in the channel of the side shield with the pass-through lock aperture residing between and aligned with the pair of channel apertures; and
   a lock pin, having an upper end and a lower end, routed through the pair of channel apertures in locking engagement with the side walls and through the pass-through lock aperture thereby securing the side shield to the temple.

2. The eyewear assembly of claim 1, further comprising:
   a pair of flanges respectively emanating inwardly from the side walls of the channel.

3. The eyewear assembly of claim 1, wherein the lock member is a wire loop.

4. The eyewear assembly of claim 1, further comprising:
   a plurality of circumferential friction ridges on the lock pin.

5. The eyewear assembly of claim 1, further comprising:
   a head connected to the upper end of the lock pin.

6. The eyewear assembly of claim 1, wherein the lock member is a body of housing positioned about a temple hinge spring connected to the temple.

7. The eyewear assembly of claim 1, wherein the first side of the temple faces inwardly toward a wearer of the eyewear assembly.

8. The eyewear assembly of claim 1, wherein the side shield is made of plastic.

9. The eyewear assembly of claim 1, wherein the lock pin is made of nylon.

10. The eyewear assembly of claim 1, wherein the temple and lock member are made of metal.

11. The eyewear assembly of claim 1, wherein the temple and lock member are of a unitary construction.

12. A method of installing an eyewear side shield assembly, comprising the steps of:

providing a temple having a first side and a second side;

providing a lock member connected to the first side of the temple; the lock member defining a pass-through lock aperture therethrough;

providing a side shield having a laterally running channel having side walls and defining a pair of channel apertures, each with a side wall, on opposing sides of the channel and aligned with one another transversely across the channel;

providing a lock pin, having an upper end and a lower end;

placing the temple in the channel of the side shield;

aligning the pass-through lock aperture with the pair of channel apertures; and routing the lock pin through the pair of channel apertures and the pass-through lock aperture;

engaging the lock pin to the respective side walls of the channel apertures; and securing the side shield to the temple.

* * * * *